(12) United States Patent
Leck et al.

(10) Patent No.: US 10,414,314 B2
(45) Date of Patent: Sep. 17, 2019

(54) MOVABLE TABLE FOR A MOTOR VEHICLE

(71) Applicant: Ford Global Technologies, LLC, Dearborn, MI (US)

(72) Inventors: Matthew Graeme Leck, Ruislip (GB); Kyle Loughlin, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/964,670

(22) Filed: Apr. 27, 2018

(65) Prior Publication Data

US 2018/0354397 A1    Dec. 13, 2018

(30) Foreign Application Priority Data

Jun. 9, 2017  (GB) .................................. 1709253.7

(51) Int. Cl.
| | |
|---|---|
| *B60N 3/00* | (2006.01) |
| *B60N 2/01* | (2006.01) |
| *B60N 2/02* | (2006.01) |
| *B60N 2/06* | (2006.01) |
| *A47B 3/00* | (2006.01) |
| *A47B 9/00* | (2006.01) |

(52) U.S. Cl.
CPC ............... *B60N 3/001* (2013.01); *A47B 3/00* (2013.01); *B60N 2/01* (2013.01); *B60N 2/0232* (2013.01); *B60N 2/06* (2013.01); *B60N 2/062* (2013.01); *A47B 2009/006* (2013.01); *B60N 2002/0204* (2013.01); *B60N 2002/0216* (2013.01)

(58) Field of Classification Search
CPC . B60N 3/001; B60N 2/01; B60N 2/06; B60N 2/062; B60N 2002/0204; B60N 2002/0216; A47B 3/00; A47B 2009/006
USPC .................................. 108/44; 297/138, 143
See application file for complete search history.

(56) References Cited

U.S. PATENT DOCUMENTS

| | | | | |
|---|---|---|---|---|
| 3,186,515 A | * | 6/1965 | Werner ...................... | A47F 9/04 186/59 |
| 3,391,960 A | * | 7/1968 | Megargle ............... | A47B 23/04 108/44 |
| 5,685,600 A | * | 11/1997 | Kuo ....................... | A47B 83/02 297/143 |
| 5,765,910 A | * | 6/1998 | Larkin ................. | A47B 83/001 297/172 |

(Continued)

FOREIGN PATENT DOCUMENTS

| | | |
|---|---|---|
| CN | 103465815 B | 5/2016 |
| DE | 102012007435 A1 | 10/2013 |

(Continued)

*Primary Examiner* — Jose V Chen
(74) *Attorney, Agent, or Firm* — Vichit Chea; Price Heneveld LLP

(57) ABSTRACT

A movable table for a motor vehicle is provided. The motor vehicle comprises a guide track extending at least partially around an interior space of the vehicle between a plurality of seating positions for seats within the vehicle. The movable table comprises a table top, a pillar, the table top being coupled to a first end of the pillar, and a follower element provided at a second end of the pillar, wherein the follower element is configured to movably couple the table to the guide track, such that the table is movable between seats positioned at the seating positions.

18 Claims, 8 Drawing Sheets

(56) References Cited

U.S. PATENT DOCUMENTS

| | | | | |
|---|---|---|---|---|
| 5,803,326 | A * | 9/1998 | Krieger | B60R 7/04 108/44 |
| 6,129,404 | A * | 10/2000 | Mattarella | B60N 2/3013 296/64 |
| 6,227,614 | B1 * | 5/2001 | Rubin | A47C 9/022 297/143 |
| 6,248,014 | B1 * | 6/2001 | Collier | A47B 21/00 454/186 |
| 6,457,765 | B1 * | 10/2002 | Bergquist | B60N 2/01 296/64 |
| 6,659,777 | B1 * | 12/2003 | Rondeau | A63H 33/00 108/44 |
| 6,752,444 | B2 * | 6/2004 | Kitano | B60R 7/04 296/184.1 |
| 6,827,388 | B2 * | 12/2004 | Kayumi | B60N 2/01 296/64 |
| 7,677,629 | B2 * | 3/2010 | Akiya | B60N 2/01 296/64 |
| 8,857,763 | B2 * | 10/2014 | Brand | B60N 2/14 244/118.5 |
| 10,023,315 | B2 * | 7/2018 | Kuyper | A47B 5/006 |
| 2007/0158969 | A1 * | 7/2007 | Walkingshaw | A61G 3/00 296/64 |
| 2008/0271645 | A1 * | 11/2008 | Swailes | A47B 31/06 108/44 |
| 2010/0019523 | A1 | 1/2010 | Fletcher | |
| 2011/0187146 | A1 * | 8/2011 | Lindsay | B60N 2/062 296/65.11 |
| 2016/0107544 | A1 | 4/2016 | Byun | |
| 2016/0332539 | A1 | 11/2016 | Rawlinson et al. | |
| 2017/0028987 | A1 | 2/2017 | Yamada | |

FOREIGN PATENT DOCUMENTS

| | | |
|---|---|---|
| DE | 102015102660 A1 | 8/2016 |
| EP | 2620366 A1 | 7/2013 |
| FR | 2882006 A1 | 8/2006 |
| JP | 11321465 A | 11/1999 |
| JP | 2002120604 A | 4/2002 |
| JP | 2005280417 A | 10/2005 |
| JP | 2006160178 A | 6/2006 |
| JP | 2008254662 A | 10/2008 |

* cited by examiner

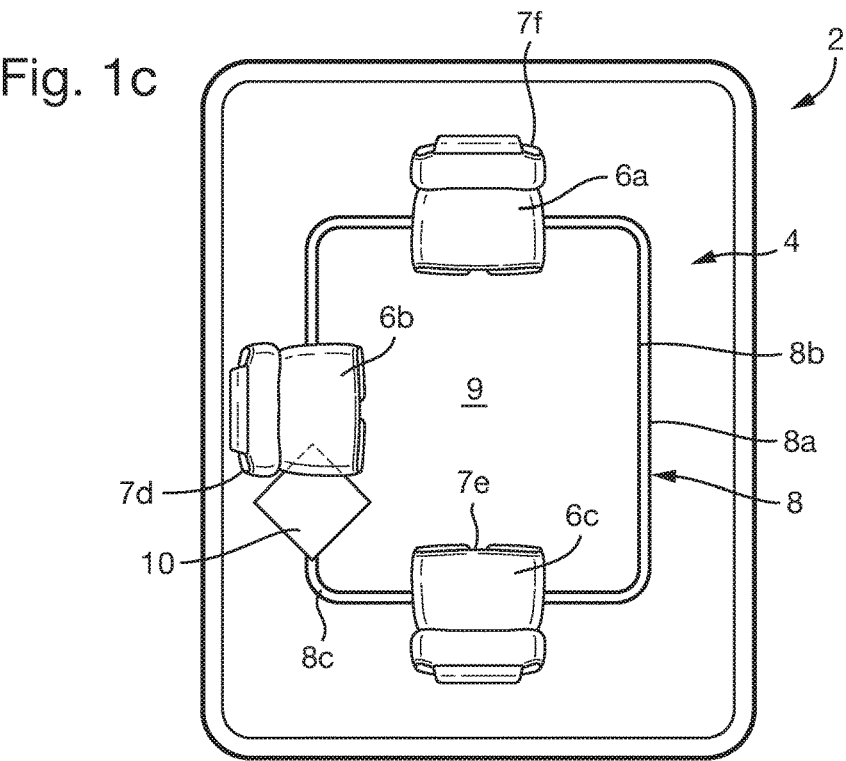
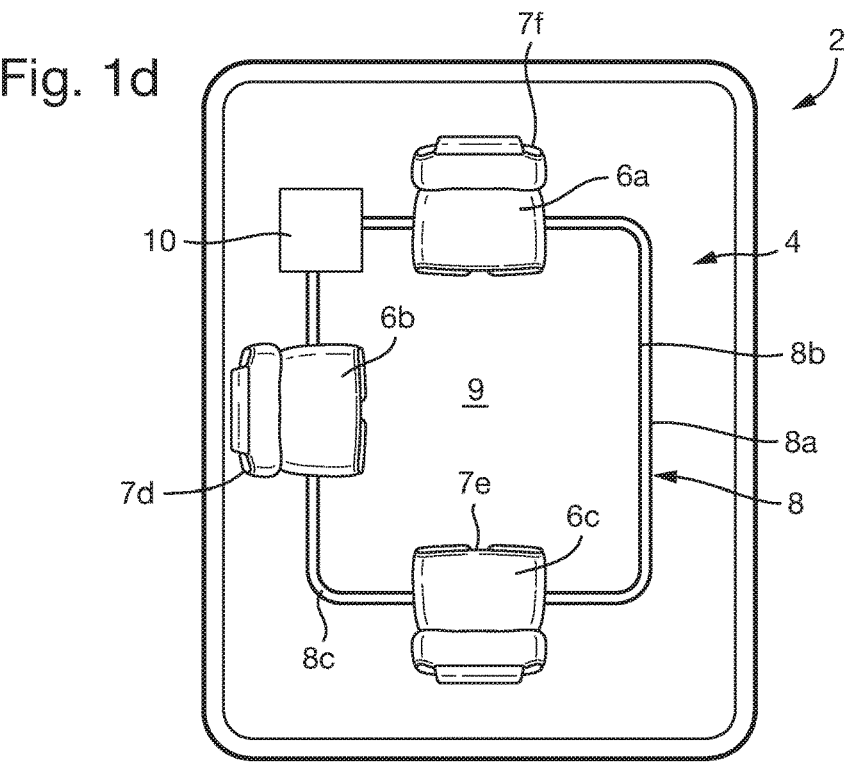

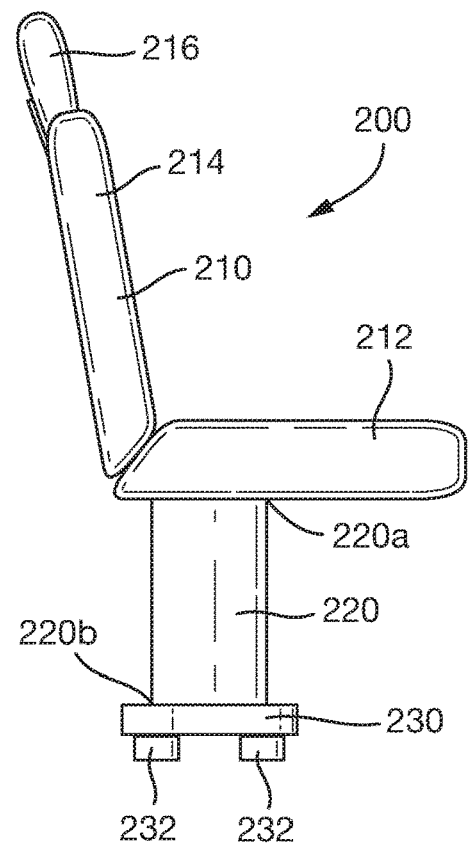
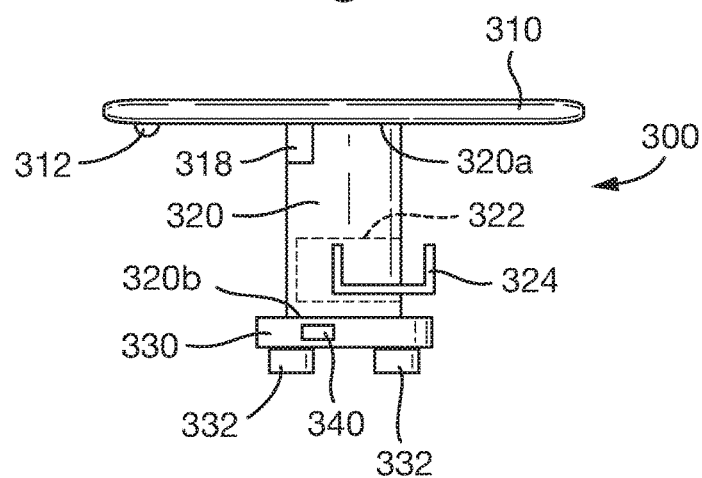

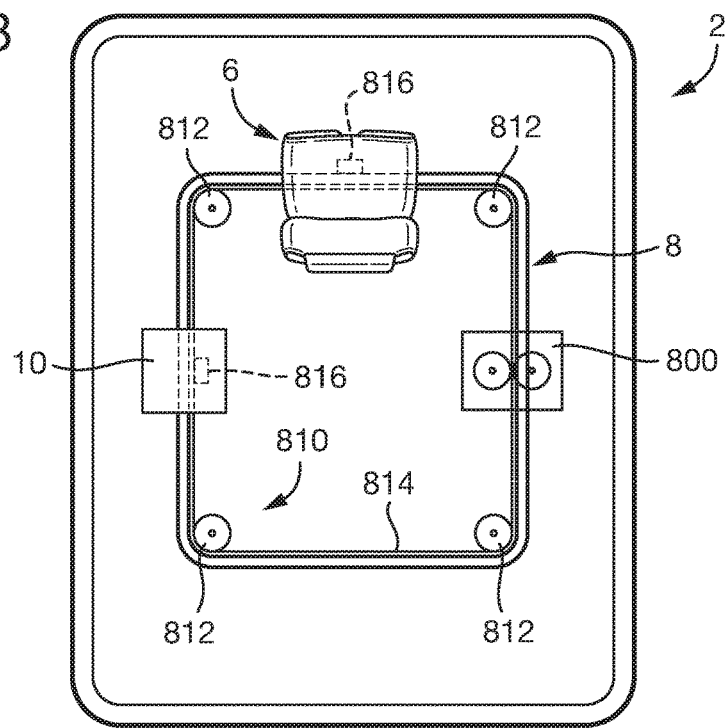
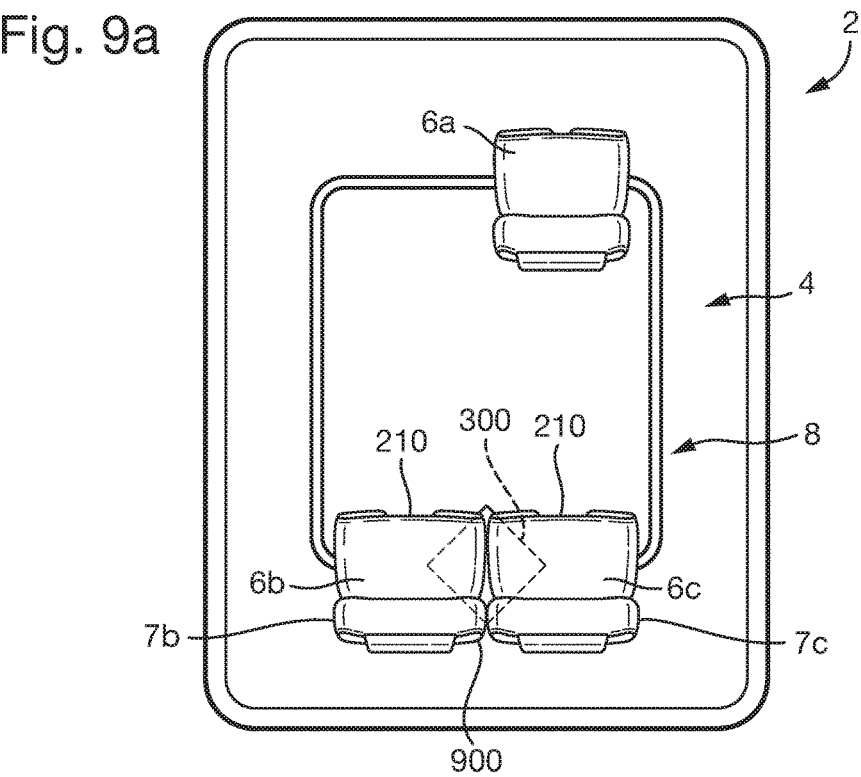

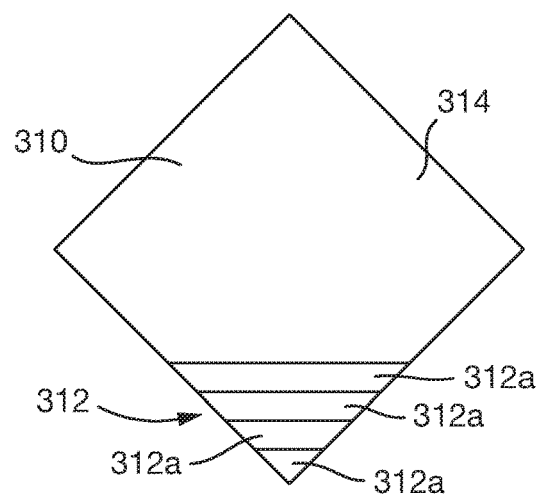
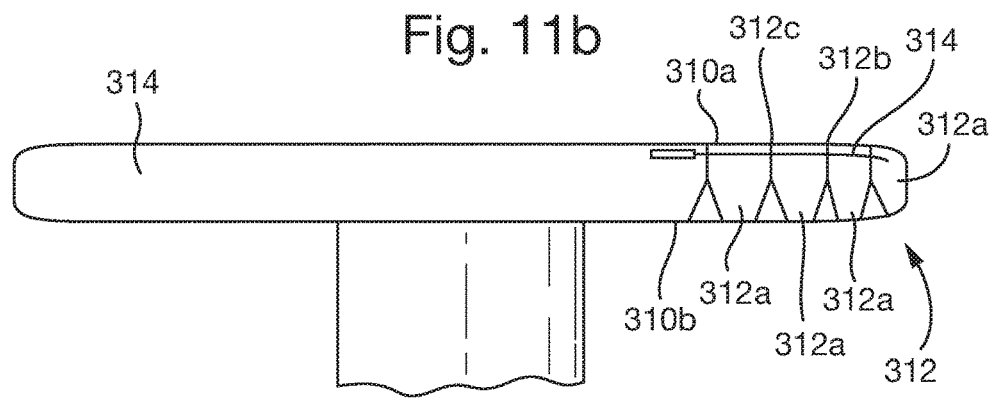
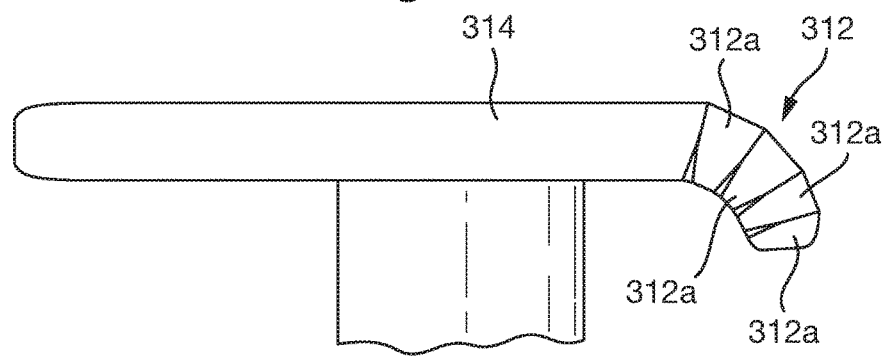

ns in a vehicle, and more particularly relates to a table for
MOVABLE TABLE FOR A MOTOR VEHICLE

FIELD OF THE INVENTION

The present disclosure generally relates to table arrangements in a vehicle, and more particularly relates to a table for a motor vehicle that is movable within the interior of the vehicle.

BACKGROUND OF THE INVENTION

A vehicle, such as a motor vehicle, may have a plurality of seats that are capable of being arranged into a number of seating configurations. For example, the seats may be arranged into a "standard" arrangement, in which the seats are arranged in one or more rows across an interior of the vehicle, each generally facing in the direction of travel. Alternatively, the seats may be arranged in a "conferencing" arrangement in which two or more of the seats are arranged to face one another. In the conferencing arrangement, the seats may be arranged in rows, or may be spaced apart around the vehicle interior. In some arrangements, the seats may be capable of changing positions between configurations during a journey in the vehicle as desired by the occupants.

The vehicle may further include a table configured to allow an occupant to store articles or documents that they wish to use or refer to during the journey. Additionally an occupant may use the table as a surface for working on during the journey. It is generally desirable for the table to be in a convenient location to be used by the occupant regardless of the positions such as the configuration of the vehicle seats.

SUMMARY OF THE INVENTION

According to an aspect of the present disclosure, a movable table for a motor vehicle includes a guide track extending at least partially around an interior space of the vehicle. The movable table includes a table top. A pillar includes a first end coupled to the table top. A follower element is provided at a second end of the pillar and is configured to movably couple the table to the guide track such that the table is movable between seats positioned at seating positions.

The guide track may be a first guide track that comprises a rail or slot. The follower element may be configured to movably couple the table to the rail or slot of the first guide track. The follower element may comprise a roller configured to engage the first guide track.

The motor vehicle may comprise a second guide track provided adjacent to the first guide track and extending parallel to the first guide track between the two or more seat positions. The table may comprise a further follower element configured to movably couple to the second guide track. The table may comprise a boss coupled to the second end of the pillar. The follower elements may be provided on the boss.

The table may further comprise a securing mechanism configured to selectively secure the table relative to a frame of the vehicle. For example, the securing mechanism may secure the boss and/or follower element to the first guide track. Alternatively, the securing mechanism may prevent the follower element moving along the first guide track by preventing a roller of the follower element from rotating.

The table top may comprise a collapsible portion. The collapsible portion may be collapsible from a deployed configuration in which the collapsible portion forms a substantially flat horizontal surface to a collapsed configuration in which at least a portion of the table top is oriented substantially vertically. When the collapsible portion is in the collapsed configuration, an area of the table top forming a flat horizontal surface may be reduced compared to when the collapsible portion is in the deployed configuration. One or more collapsible portions may form corners of the table top. The collapsible portion may comprise a plurality of elongate members. The elongate members may be configured to move, e.g., rotate and/or slide, relative to one another in order to permit the table top to collapse.

The table top may comprise one or more cables extending between the elongate members. The cables may be configured to hold the elongate members together when the collapsible portion is deployed due to tension within one or more of the cables. Tension in one or more of the cables may be released in order to permit the collapsible portion to collapse. Additionally or alternatively, one or more of the cables may be configured to pull the collapsible portion into a collapsed configuration when the one or more cables are in tension.

The pillar may comprise a storage space, such as a drawer or cupboard, defined within the pillar.

The movable table may comprise an actuator configured to drive the movement of the movable table along the guide track assembly. Alternatively, the movable table may comprise a drive coupler configured to selectively couple the movable table to a drive mechanism provided on the vehicle for moving the table and optionally the seats along the guide track assembly. The height of the table top of the movable table above the first guide track may be adjustable, for example, between a height at which the table can be stowed underneath a seat body of a seat and a height at which the table top is at or above the level of the seat body. The table may be configured to rotate as the guide track changes direction as the movable table moves along a curved portion of the guide track. Additionally or alternatively, the table, such as the table top and/or pillar, may be configured to rotate relative to the guide track by moving/rotating relative to the follower element.

According to another aspect of the present disclosure, a motor vehicle assembly includes a guide track extending at least partially around a space within an interior of the vehicle between a plurality of seating positions. A table is movably coupled to and supported by the guide track, such that the table is movable along the guide track between the seats positioned at the seating positions.

The table may comprise the above-mentioned movable table. The table may comprise a table top, a pillar configured to support the table top. The table top may be coupled to a first end of the pillar, and a follower element may be provided at a second end of the pillar and configured to movably couple the table to the guide track. The table may further comprise a boss provided at the second end of the pillar, the follower element may be coupled to the boss.

At least a portion of the guide track may extend in a longitudinal direction of the motor vehicle. Additionally or alternatively, at least a portion of the guide track may extend in a lateral direction of the motor vehicle. At least a portion of the guide track may be curved. The curved portion may be provided between the longitudinally and laterally arranged portions of the guide track.

The guide track may be a first guide track and the assembly may comprise a second guide track provided adjacent to the first guide track and extending parallel to the first guide track between the seat positions. The table may be movably coupled to the second guide track. The assembly may comprise two or more seats. The table may be coupled to the first guide track between two of the seats and may be movable between the two seats. The seats may be movably coupled to the first guide track and/or the second guide track, and may be movable along the first guide track and/or the second guide track between the seating positions.

A height of a table top of the table above the first guide track may be less than heights of seat bodies of the seats above the first guide track, such that the table top can be positioned at least partially beneath the seat body of one or more of the seats. The height of the table top may be adjustable such the height is less than the heights of the seat bodies. The table may be movable between a stowed position, in which the table is positioned at least partially beneath seat bodies of one or more of the seats, and a deployed position.

The assembly may be configured such that when the two seats are substantially aligned, e.g., in a longitudinal or lateral direction of the motor vehicle, such that sides of the seats are adjacent to a parallel to one other, the table may be stowed beneath seat bodies of the two seats. In other words, when the seats are positioned close together, side by side, the table may be stowed beneath the seat bodies and when the seats are apart, the table may be deployed between the seats. In the stowed position, the table may be received between seat pillars configured to support the seat bodies above the guide track. The table, such as the table top, may be rotatable such that when the table is stowed beneath one or more of the seat bodies, a diagonal axis of the table may be aligned with, e.g., parallel to, a longitudinal axis of the seat.

The movable table may be providable in a corner of the motor vehicle between the two seats, the seats being arranged perpendicular to one another. A first edge of the table top may be positionable alongside, e.g., substantially parallel to, an edge of a first seat and a second edge of the table top may positionable alongside, e.g., substantially parallel to, an edge of a second seat. The first and second edges of the table top may be substantially perpendicular to each other.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

These and other aspects, objects, and features of the present invention will be understood and appreciated by those skilled in the art upon studying the following specification, claims, and appended drawings.

BRIEF DESCRIPTION OF THE DRAWINGS

For a better understanding of the present invention, and to show more clearly how it may be carried into effect, reference will now be made, by way of example, to the accompanying drawings, in which:

FIG. 1c is a schematic plan view of a motor vehicle assembly, according to arrangements of the present disclosure, in a third configuration;

FIG. 1d is a schematic plan view of a motor vehicle assembly, according to arrangements of the present disclosure, in a fourth configuration;

FIG. 2 is a schematic view of a seat for a seating system, according to arrangements of the present disclosure;

FIG. 3 is a schematic view of a table for a vehicle, according to arrangements of the present disclosure;

FIG. 8 is a schematic plan view of a vehicle assembly according to arrangements of the present disclosure;

FIG. 9a is a schematic plan view of a motor vehicle assembly according to arrangements of the present disclosure, in a fourth configuration;

FIG. 11a is a plan view of movable table having a collapsible portion, according to arrangements of the present disclosure, in a deployed configuration;

FIG. 11b is a schematic sectional view of a movable table having a collapsible portion, according to arrangements of the present disclosure, in a deployed configuration; and FIG. 11c is a schematic sectional view of a movable table having a collapsible portion, according to arrangements of the present disclosure, in a collapsed configuration.

DETAILED DESCRIPTION OF THE PREFERRED EMBODIMENTS

Figure 1A:
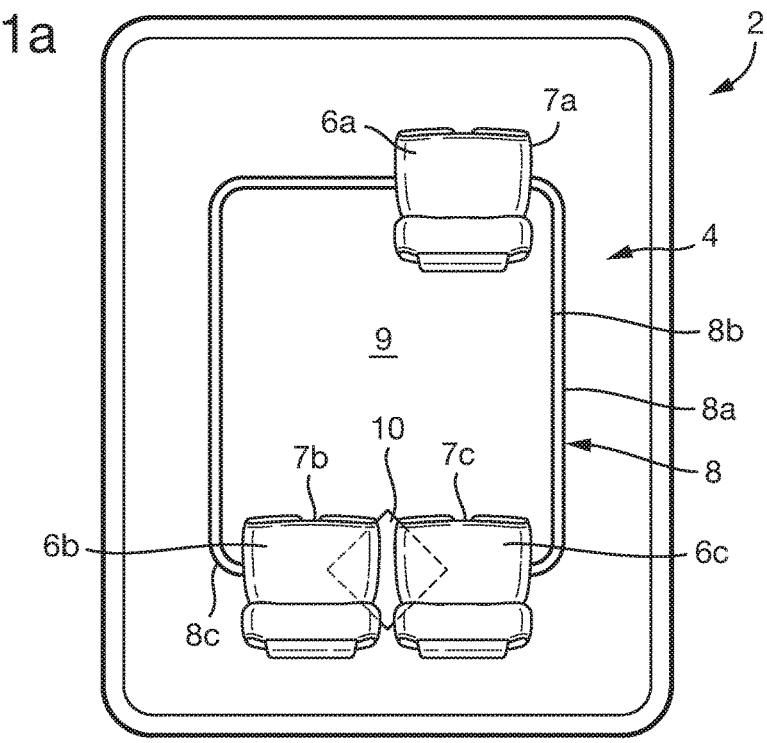
FIG. 1a is a schematic plan view of a motor vehicle assembly, according to arrangements of the present disclosure, in a first configuration.

With reference to FIGS. 1a, 1b, 1c and 1d, a motor vehicle assembly 2, according to arrangements of the present disclosure, comprises a guide track assembly 8 and a movable table 10. In the depicted arrangement, the motor vehicle assembly 2 further comprises a seating system 4. The seating system 4 comprises a plurality of seats 6a, 6b, 6c. The seats are movably supported by the guide track assembly 8, such that the seats are movable between seating positions 7a, 7b, 7c, 7d, 7e, 7f defined within the vehicle.

In the arrangement shown in FIG. 1, the seating system 4 comprises three seats, a first seat 6a, a second seat 6b and a third seat 6c. The seats are movable between six seating positions 7a-7f. In other arrangements, the seating system 4 may comprise one, two, four, or more than four seats, which may be movable between two, three or more than three seating positions. In some arrangements, particular, or discrete, seating positions may not be defined by the seating system, and the seats may be movable to any desired position along the guide track assembly 8.

The movable table 10 is movably, e.g., slidably, supported by the guide track assembly 8, such that the table is movable along the guide track assembly 8. In particular, the movable table 10 may be movable between seats, such as a pair of seats, of the vehicle such that occupants in different seats of the vehicle can use the table as desired.

Figure 1B:
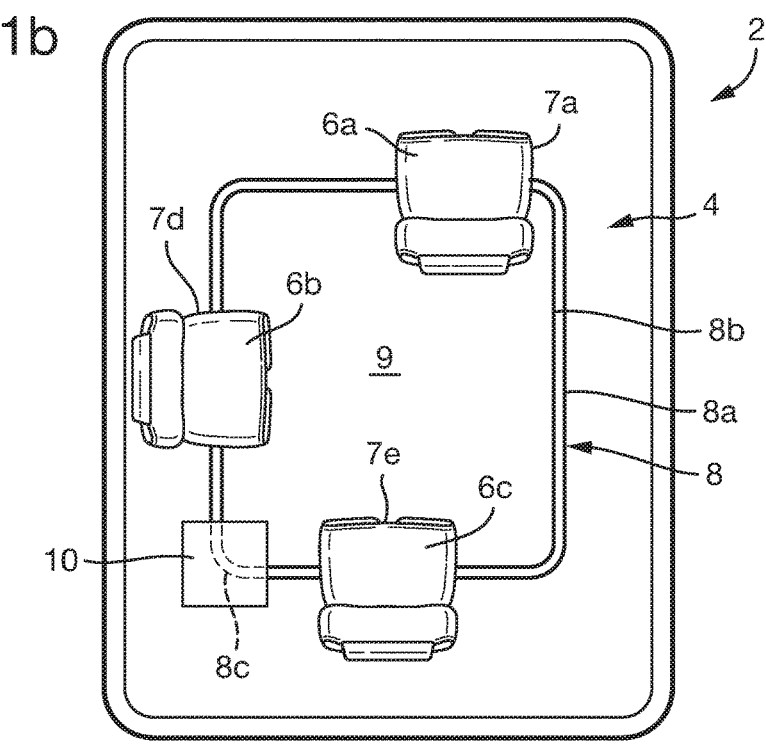
FIG. 1b is a schematic plan view of a motor vehicle assembly, according to arrangements of the present disclosure, in a second configuration.

As depicted in FIGS. 1a-1d, the movable table 10 is provided on the guide track assembly 8 between two of the seats, shown as the second seat 6b and the third seat 6c. The movable table 10 can be moved along the guide track assembly 8 to any position between the two seats. As the two seats 6b, 6c are moved within the vehicle along the guide track assembly 8, the positions that the movable table 10 can be moved to change. For example, when the second and third seats 6b, 6c are positioned in the second and third positions 7b, 7c, as depicted in FIG. 1a, the movable table 10 is only able to move a short distance between the second and third seats 6b, 6c. In contrast, when the second seat 6b has been moved to the fourth position 7d, as depicted in FIGS. 1b and 1c, the movable table 10 is able to move a greater distance along the guide track assembly 8. In particular, the movable table 10 is able to move around a corner 8c defined by the guide track assembly 8 between the positions of the second and third seats 6b, 6c. The movable table 10 is therefore able to move in a lateral direction within the vehicle interior and/or in a longitudinal direction within the vehicle interior depending on the configuration of the guide track assembly 8 and the positions of the seats 6.

The guide track assembly 8 comprises a first guide track 8a and a second guide track 8b. The second guide track 8b is arranged to the side of, e.g., radially inside of, the first guide track 8a. The first and second guide tracks 8a, 8b extend around a space 9 within the interior of the vehicle 2. In the arrangement shown, the guide track assembly 8, extends completely around the space 9 to form a closed loop enclosing the space 9. In other arrangements, the guide track assembly 8 may extend partially around the interior space 9.

When the guide track assembly 8 forms a closed loop, the seats 6a, 6b, 6c may be movable completely around the loop, such that a particular seat is movable from a first seating position, such as position 7a, through the other seating positions 7b-7f, back to the first seating position. Each of the seats may thereby be positioned in each of the seating positions. Similarly, when the guide track assembly 8 forms a closed loop, the movable table 10 may also be movable completely around the loop, e.g., together with the two seats between which the movable table 10 is provided.

The order of the seats 6a, 6b, 6c and the movable table 10 around or along the guide track assembly 8 may be maintained as the seats 6 move between the seating positions 7a-7f and the movable table 10 is moved between the seats. In other words, the seats 6a, 6b, 6c and the movable table 10 may be prevented from moving past one another along the guide track assembly 8.

When the guide track assembly 8 extends around one or more sides of the interior space 9 and does not form a closed loop, each of the seats may be movable between two or more of the seating positions. In such arrangements, a particular seat may not be movable along the guide track assembly 8 to each of the seating positions, due to the presence of the other seats. When the guide track assembly 8 does not form a closed loop, e.g., when the guide tracks 8a, 8b of the guide track assembly extend between ends of the guide track assembly, the movable table 10 may be provided between a seat and one of the ends of the guide track assembly. In this case, the movable table may be movable between the seat and the end of the guide track assembly.

In some arrangements, the seats 6a, 6b, 6c may be configured to be detachable from the guide track assembly 8, in order to allow the order of the seats and the movable table 10 along the guide track assembly 8 to be changed.

When the order of the seats is changed, the seating positions that a particular seat can be positioned in, e.g., before its movement along the guide track assembly 8 is blocked by the other seats, may also be changed. Furthermore, when the order of the seats 6 is changed, the seats that the movable table 10 is positioned between may also be changed.

Additionally or alternatively, the movable table 10 may be configured to be detachable from the guide track assembly 8. The movable table 10 may be decoupled from the guide track assembly 8 and recoupled to the guide track assembly 8 at a different position, such as between a different pair of seats 6, such that the movable table 10 can be moved between different ones of the seats 6 within the vehicle or one of the seats and one of the ends of the guide track assembly. For example, in the arrangement shown in FIG. 1d, the movable table 10 has been recoupled to the guide track assembly 8 between the first and second seats 6a, 6b, such that the movable table 10 is movable between the first and second seats 6a, 6b.

In alternative arrangements, the seats 6 and/or the movable table 10 may be configured such that one or more of the seats and the table are able to move past one another as they move along the guide track assembly 8.

With reference to FIG. 2, a seat 200 for the seating system 4 will now be described. The seats 6a, 6b, 6c depicted in FIG. 1 may be similar to the seat 200 shown in FIG. 2 and described below. The features described in relation to the seat 200 may apply equally to the seats 6a, 6b, 6c. The seat 200 comprises a seat body 210 having a base 212 and a back rest 214. The seat body 210 may also comprise a head rest 216. The seat body 210 is supported by a seat pillar 220. The seat pillar 220 extends in a substantially vertical direction from a first end 220a of the seat pillar to a second end 220b. The first end 220a of the seat pillar is coupled to the seat body 210, such as to the base 212, and the second end 220b is coupled to a boss 230 of the seat 200.

In the arrangement shown in FIG. 2, the seat pillar 220 is a tubular support member having an obround cross-section. However, in other arrangements, the cross-section of the seat pillar 220 may be circular, oval, square, rectangular or any other desirable shape. Alternatively, the seat pillar 220 may comprise a solid beam, such as an I-beam or any other desirable structure or framework. When the seat pillar 220 comprises a solid beam, such as an I-beam, or another structure or framework, the seat pillar 220 may comprise a tubular trim portion surrounding the solid beam, structure or framework.

The seat 200 further comprises one or more follower assemblies 232 coupled to the boss 230. The follower assemblies 232 are configured to engage the guide track assembly 8 in order to guide the movement of the seat 200 between seating positions, such as the seating positions 7a-7f shown in FIG. 1. Additionally, the follower assemblies 232 and/or the boss 230 may be configured to support the seat 200 within the vehicle, and to transfer any loads from the seat, such as the weight of a passenger seated in the seat, to a frame (not shown) of the vehicle.

With reference to FIG. 3, a movable table 300 for the vehicle assembly 2 will now be described. The movable table 10 described with reference to FIG. 1 may correspond to the movable table 300 shown in FIG. 3 and described below. The movable table 300 comprises a table top 310 supported by a table pillar 320. The table top 310 is coupled to the table pillar 320 at a first end 320a of the table pillar. The table pillar may extend in a substantially vertical direction to a second end 320b of the table pillar. The second end 320b of the table pillar is coupled to a table boss 330.

The table pillar 320 is configured similarly to the seat pillar 220 and is a tubular support member having an obround cross-section. In other arrangements, the cross-section of the table pillar 320 may be circular, oval, square, rectangular or any other desirable shape. As depicted in FIG. 3, the table pillar 320 defines a storage space 322 within the pillar. In the arrangement shown in FIG. 3, the pillar 320 comprises a drawer 324 received within the storage space 322. The drawer 324 is movable from a closed position, in which the drawer 324 is substantially completely received in the storage space 322, to an open position, as depicted in FIG. 3. In alternative arrangements, the storage space 322 may form a cupboard and the movable table 300 may comprise a cupboard door movably, e.g., slidably or pivotally, coupled to the table pillar 320 at the storage space 322 to provide access to the storage space.

In other arrangements, the table pillar 320 may comprise a solid beam, such as an I-beam or any other desirable structure or framework. When the table pillar 320 comprises a solid beam, such as an I-beam, of a structure or framework, the table pillar 320 may comprise a tubular trim portion surrounding the solid beam. Furthermore, when the table pillar 320 comprises a solid beam, the table pillar 320 may not define a storage space 322. However, when the table pillar 320 comprises another structure or framework, the structure or framework may be configured to accommodate or define the storage space 322.

The movable table 300 further comprises one or more follower assemblies 332 coupled to the boss 330. The follower assemblies 332 are configured to engage the guide track assembly 8 in order to guide the movement of the movable table 300 along the guide track assembly 8 between adjacent seats. Additionally, the follower assemblies 332 and/or the boss 330 may be configured to support the table 300 within the vehicle to transfer any loads from the table 300, such as the weight of items placed on the table top 310 and/or in the storage space 322, to the frame of the vehicle.

In some arrangements of the present disclosure, the boss 230 of the seat 200 may be similar to the boss 330 of the movable table 300 since they are configured to move along the same track. Additionally, the follower assemblies 232 provided on the seat 200 may be similar to the follower assemblies 332 provided on the movable table 300.

Figure 4:
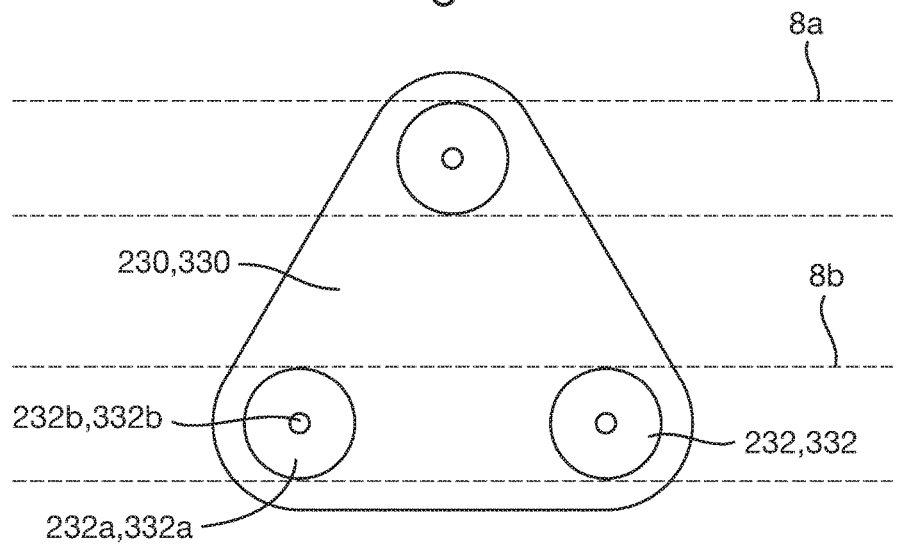
FIG. 4 is a schematic view of a boss for a seat or table, according to arrangements of the present disclosure.

With reference to FIG. 4, in some embodiments of the present disclosure, the bosses 230, 330 are substantially triangular, having three rounded corners. Three follower assemblies 232, 332 are coupled to each boss 230, 330 close to the corners of the boss 230, 330 on lines perpendicular to and bisecting the edges of the boss 230, 330. One of the follower assemblies 232, 332 is configured to engage with the first guide track 8a and two of the follower assemblies 232, 332 are configured to engage with the second guide track 8b.

In other arrangements, it is also envisaged that the bosses 230, 330 may be any other desirable shape and any number of follower assemblies 232, 332 may be coupled to the bosses. For example, the bosses 230, 330 may be circular, oval, square or rectangular and may comprise two, four, or more than four follower assemblies. In other arrangements, different numbers of the follower assemblies may engage with different ones of the guide tracks 8a, 8b. For example, two of the follower assemblies may engage with the first guide track 8a and one of the follower assemblies may engage with the second guide track 8b.

Furthermore, in other arrangements, the boss 230 provided on the seat 200 may be a different shape to the boss 330 provided on the movable table 300 and/or may comprise a different number of follower assemblies 232.

As depicted in FIG. 4, the follower assemblies 232, 332 each comprise one or more follower elements, such as rollers 232a, 332a rotatably coupled to the bosses 230, 330 by respective pivots 232b, 332b. The follower elements are configured to engage with and roll along the guide tracks 8a, 8b of the guide track assembly 8 in order to support the movement of the seats 200 and movable table 300, respectively.

In the arrangements shown in FIG. 4, each of the follower assemblies 232, 332 comprises a single follower element shown as a single roller 232a, 332a, respectively. However, in other arrangements, each follower assembly 232, 332 may comprise two, three, four or more than four follower elements, each configured to engage with the guide track assembly 8 as desired.

The bosses 230, 330 and follower assemblies 232, 332 are configured such that the orientation of the boss 230, 330 within the vehicle is determined according to the position of the seat 200 or movable table 300 along the guide track assembly 8, e.g., the position on the guide tracks 8a, 8b at which the follower assemblies 232, 332 are engaged. The table pillar 320 may be fixedly coupled to the boss 330 and the table top 310 may be fixedly coupled to the table pillar 320. In this arrangement, the orientation of the table top 310 is determined according to the position of the movable table 10 along the guide track assembly. In other words, the orientation of the movable table 10 within the vehicle interior 9 may be changed, for example, the movable table 10 may be rotated, by virtue of the curved guide track assembly 8.

Additionally or alternatively, the table top 310 may be movably, e.g., pivotally, coupled to the table pillar 320, e.g., at the first end 320a of the table pillar, in order to allow the orientation of the table top 310 to be adjusted without the movable table 10 being moved along the guide track assembly 8.

Additionally or alternatively again, it is also envisaged that the table pillar 320 may be pivotally coupled to the boss 330, such that the table pillar 320 and the table top 310 can be rotated relative to the guide track assembly 8. Alternatively, in other arrangements, the follower assemblies 332 may be movably coupled to the boss 330, or otherwise configured to allow the boss 330 to rotate relative to the guide track assembly 8 in order to adjust the orientation of the table pillar 320 and the table top 310.

With reference to FIG. 3, the movable table 300 may comprise a locking mechanism 318 configured to prevent movement, e.g., pivoting, of the movable table 300 or table top 310 relative to the guide track assembly 8, unless the locking mechanism 318 is disengaged. The movable table 300 further comprises a securing mechanism 340 configured to selectively secure the movable table 300 relative to the frame of the vehicle, in order to prevent movement of the movable table 300 along the guide track assembly 8 when such movement is undesirable. For example, the movable table 300 may be secured using the securing mechanism 340 when the vehicle is moving.

The securing mechanism 340 may be provided on the boss 330 or table pillar 320. The securing mechanism 340 may be configured to engage with the guide track assembly 8 and/or the frame of the vehicle in order to prevent movement of the movable table 300. Alternatively, the securing mechanism 340 may be configured to prevent the follower assemblies 332 from moving along the guide tracks 8a, 8b in order to prevent movement of the movable table 300. For example, the securing mechanism 340 may prevent rollers 332a of the follower assemblies 332 from rotating and rolling along the guide tracks 8a, 8b.

In other embodiments of the disclosure, a plurality of securing mechanisms 340 may be provided on the guide track assembly 8 or may be coupled to the frame of the vehicle 2. The securing mechanisms 340 may be configured to engage with the boss 330 and/or follower assemblies 332 of the movable table 300 in order to prevent their movement along the guide tracks 8a, 8b in order to secure the movable table 300 at the position of the securing mechanism 340. Additionally or alternatively, the securing mechanisms 340 may be configured to engage with a dedicated securing feature (not shown) provided on the movable table 300.

The securing mechanisms 340 may be provided at a plurality of positions along the guide track assembly. For example, securing mechanisms 340 may be provided at or adjacent to each of the seating positions 7a-7f defined by the seating system 4, such as depicted in FIG. 1, to allow the movable table to be secured at or adjacent to the seats 6a, 6b, 6c when they are arranged at each of the seating positions 7a-7f.

When the securing mechanism 340 is provided on the movable table 300, the movable table 300 may be secured in any position along the guide track assembly 8. However, in some arrangements, the securing mechanism 340 may be configured such that the movable table 300 can only be secured at predetermined positions. For example, the securing mechanism 340 provided on the movable table 300 may be configured to engage with securing features provided on the guide track assembly 8, the frame of the vehicle or the seats 6.

Even when the securing mechanism 340 is capable of securing the movable table 300 in any position along the guide track assembly 8, it may be desirable that the movable table 300 can only be secured in particular positions or that the movable table cannot be secured in other particular positions. For example, it may be desirable to prevent the movable table being secured in a position that may restrict access to a door way of the vehicle. The vehicle assembly 2 may comprise one or more table position sensors 312 configured to determine the position of the movable table 300. The securing mechanism 340 may be prevented from securing the movable table relative to the guide track assembly 8 when the movable table is not in a predetermined securing position. As depicted, the table position sensors 312 may be provided on the movable table 300. Alternatively, the table position sensors may be provided on the guide track assembly 8 or frame of the vehicle.

The vehicle assembly 4 may be configured to indicate to a user when the movable table is positioned at a predetermined securing position and can be secured. For example, the vehicle assembly 2 may be configured to illuminate a light provided on the movable table, to indicate that the movable table is in a suitable securing position, or display a message on a display screen provided on the vehicle. In some arrangements, the vehicle assembly may be configured to indicate where, e.g., in which direction, the movable table 300 should be moved in order to position the movable table in the closest predetermined securing position.

Figure 5:
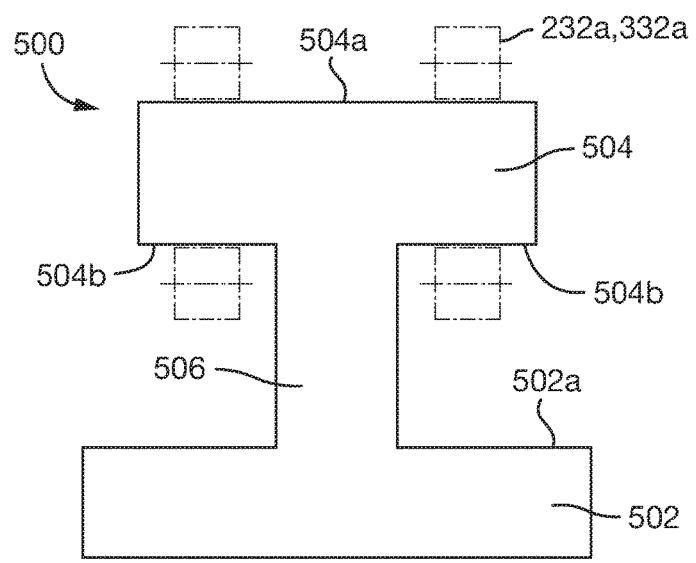
FIG. 5 is a cross-sectional view of a guide track for a seating system according to arrangements of the present disclosure.

With reference to FIG. 5, one or both of the first and second guide tracks 8a, 8b may comprise a rail 500 having a base flange 502, a head flange 504 and a web 506 between the head flange 504 and the base flange 502. The base flange 502 may be coupled to the frame of the vehicle.

The follower assemblies 232, 332 of the seat 200 and movable table 300 may be configured to engage with the head flange 504 of the rail 500. The follower assemblies 232, 323 roll along the head flange 504 in order to allow the seat 200 and movable table 300 to move along the guide tracks 8a, 8b.

The follower assemblies 232, 332, in particular the rollers 232a, 332a of the follower assemblies, may be configured to engage with a top surface 504a and/or a bottom surface 504b of the head flange 504. For example, in the arrangement shown in FIG. 5, the follower assembly 232, 332 comprises four rollers 232a, 332a configured to engage with the top and bottom surfaces of the head flange 504 on both sides of the web 506. In this arrangements, the pivots 232b, 332b of the follower elements 232, 332 are arranged in directions perpendicular to the axes of the pivots 232b, 332b depicted in FIG. 4 in order for the rollers 232a, 332a to engage the webs of the flange. In other arrangements, axes of the pivots 232b, 332b may be arranged in other direction as desirable.

In other arrangements, the follower assemblies 232, 332 may additionally or alternatively be configured to engage with the base flange 502, such as a top surface 502a of the base flange. Additionally or alternatively again, the follower assemblies 232, 332 may be configured to engage the rail web 506.

Figure 6:
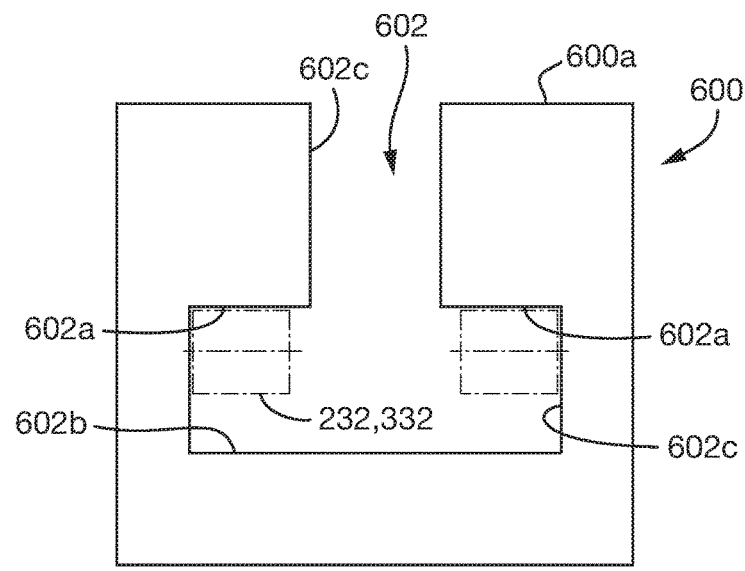
FIG. 6 is a cross-sectional view of a guide track for a seating system according to arrangements of the present disclosure.

With reference to FIG. 6, in another arrangement of the disclosure, one or both of the guide tracks 8a, 8b may comprise a channel 600 having a slot 602, e.g., a T-shaped slot. The follower assemblies 232, 332 may be at least partially received within the slot 602. For example, rollers 232a, 332a of the follower assemblies 232, 332 may be disposed within the slot 602. The follower assemblies 232, 332 may be configured to engage with the channel 600 at the slot 602 in order to support the movement of the seat 200 and movable table 300 along the guide tracks 8a, 8b.

In the arrangement shown, the follower assemblies 232, 332 are configured to engage with an upper, inside surface 602a of the slot. In other arrangements, the follower assemblies 232, 332 may be configured to engage with a lower, inside surface 602b of the slot. Additionally or alternatively, in some arrangements, the follower assemblies 232, 332 may be configured to engage with one or more side surfaces 602c of the slot. Additionally or alternatively again, the follower assembly 232, 332 may be configured to engage with an upper surface of the channel 600a outside of the slot 602. For example, the follower assemblies 232, 332 may comprise one or more rollers 232a, 332a arranged outside of the slot 602.

The movable table 300 may be configured to be moved manually by a user pushing or pulling the movable table such that the follower assemblies 332 move along the guide track assembly 8. Additionally or alternatively, the movable table 300 may be configured such that the movable table is moved by the seats 6 as they move along the guide track assembly 8 between the seating positions 7a-7f For example, the movable table 300 may be couplable to the seats such that the movable table is moved as the seats move. The seating system 4 may comprise actuators configured to drive the movement of the seats. Hence, the movable table 300 may be moved by the actuators provided within the seating system 4.

Figure 7:
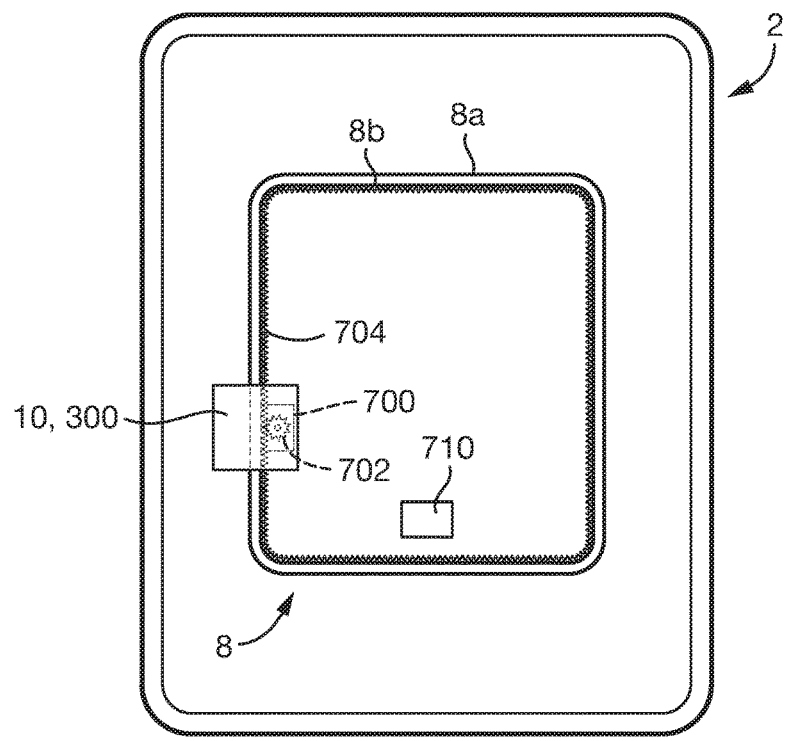
FIG. 7 is a schematic plan view of a vehicle assembly according to arrangements of the present disclosure.

Alternatively, as depicted in FIG. 7, the vehicle assembly 2 may comprise an actuator 700 configured to drive the movement of the movable table 10, 300 around the guide track assembly. In the arrangement shown in FIG. 7, the actuator 700 is provided on the movable table 10, 300 and drives the movement of the movable table 10 along the guide track assembly 8 individually, e.g., separately from the movement of the seats.

In the arrangement shown in FIG. 7, the actuator 700 is configured to rotate one or more pinion gears 702 that meshes with one or more racks 704 provided on the guide track assembly 8 in order to drive the movable table 10, 300 along the guide track assembly 8. The follower assembly 332 may comprise the pinion gears 702. For example, rollers 332a of the follower assembly may define the pinion gears 702 and the rack 704 may be coupled to or formed on one or both of the guide tracks 8a, 8b.

Although in the arrangement shown in FIG. 7, the actuator 700 drives the movement of the movable table using a gear drive system comprising the pinion gear 702 and the rack 704, it is equally envisaged that, in other embodiments of the disclosure, the actuator 700 may be configured to drive the movement of the movable table 300 using any other desirable drive system, such as a belt or chain drive system.

The vehicle assembly 2 may comprise a controller 710 configured to control the operation the actuator 700. The controller 710 may also be configured to control the operation of the actuators provided in the seating system 4 in order to drive the movement of the seats amongst the seating configurations shown in FIGS. 1a-1d. The controller 7110 may be configured to control the movement of the movable table 300 together with the movement of the seats 6 such that the movable table 300 remains in the same position relative to one or more of the seats as the seats move around the guide track assembly 8.

With reference to FIG. 8, in an alternative embodiment of the present disclosure, the vehicle assembly 2 comprises an actuator 800 provided on the guide track assembly 8 or frame of the vehicle. In other words, the actuator 800 may be fixed relative to the frame of the vehicle and may not move together with the seats 6 or movable table 10. In this embodiment, only one seat 6 is provided. However, it is equally envisaged that two, three, four or any desirable number of seats 6 may be provided within the seating system shown in FIG. 8 and configured as described below.

The vehicle assembly further comprises a drive mechanism 810 powered by the actuator 800. In the arrangement shown in FIG. 8, the drive mechanism 810 comprises a cable drive system comprising a plurality of pulleys 812 and a cable 814. However, the drive mechanism 810 may additionally or alternatively comprise any other suitable drive mechanism, such as a chain or gear drive mechanism.

The drive mechanism 810 is configured such that the cable 814 follows the guide track assembly 8. The seats 6 and/or the movable table 10 can be coupled to the drive mechanism, e.g., to the cable 814, such that the movement of the seats 6 and/or movable table 10 is driven by the actuator 800 via the drive mechanism 810.

In the arrangement shown in FIG. 8, the seat 6 and the movable table 10 each comprises a drive coupler 816 associated with the seat 6 and the movable table 10, respectively, and configured to couple the associated seat 6 or the movable table 10 to the drive mechanism 810. The drive couplers 816 are configured to selectively couple the associated seat or the movable table to the drive mechanism 810. In this way, a particular seat or the movable table 10 can be decoupled from the drive mechanism 810 while the movement of others of the seats and/or the movable table continues to be driven by the drive mechanism 810. This allows the relative positions of the seats and the movable table to be changed. One or more actuators and associated drive mechanisms can thereby be used to control the positions of a greater number of seats, such as greater than the number of actuators and drive mechanisms.

In one arrangement, a single actuator 800 is used to control the positions of each of the seats 6 and the movable table 10 provided within the vehicle assembly 2. However in other arrangements, the vehicle assembly 2 may comprise two or more actuators 800 and associated drive mechanism 810. For example, a first group, such as two of the seats, may be couplable to a first drive mechanism driven by a first actuator and a second group of seats, such as a remaining seat, may be couplable to the second drive mechanism driven by a second actuator. The movable table may be couplable to the first or second drive mechanism, or a third drive mechanism. In some arrangements, the vehicle assembly 2 may comprise an actuator 800 and drive mechanism 810 for each of the seats 6 and the movable table 10.

Figure 9B:
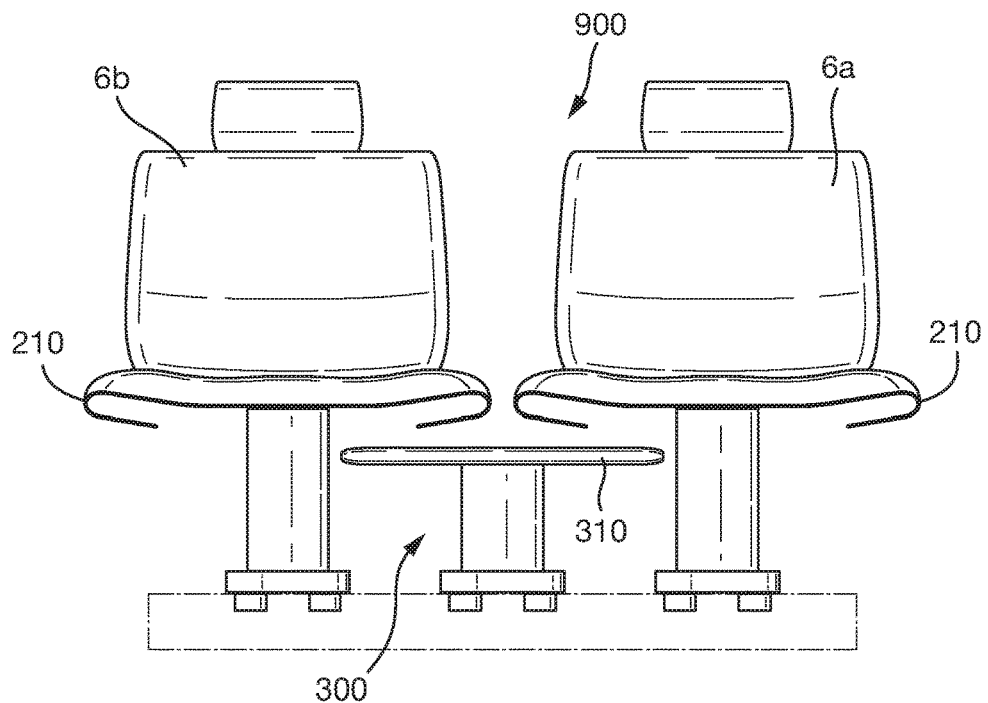
FIG. 9b is a front view of a seating system and movable table according to arrangements of the present disclosure.

With reference to FIGS. 9a and 9b, the width of each of the seats 200, such as the seat bodies 210 of the seats, may be selectively variable, e.g., adjustable. The width of the seats 200 may be adjusted between a first width (as depicted in FIG. 1) and a second width (as depicted in FIGS. 9a and 9b).

As shown in FIGS. 9a and 9b, when the widths of two adjacent seats 6b, 6c has been increased, the seat bodies 210 of the adjacent seats abut. The two adjacent seats thereby form a bench seat 900. Forming the bench seat 900 may provide additional space to allow an additional occupant to be seated in the vehicle. When the adjacent seats are arranged in the second and third seating positions 7b, 7c, the seat bodies 210 may abut at a center of the vehicle and the bench seat 900 may extend across substantially the complete width of the interior of the vehicle 2.

The movable table 300 may be configured such that the table top 310 is at a lower height above the guide track assembly 8 than the seat body 210. Hence, as depicted in FIGS. 1a, 1c, 9a and 9b the movable table 300 can be positioned such that at least part of the table top 310 is located beneath the seat body 210 of one or more seats. The height of the table top 310 may be fixed at a desirable height. Alternatively, the movable table 300 may be configured such that the table top 310 can be raised and lowered to fit under the seat body selectively.

As depicted in FIGS. 9a and 9b, when the movable table 300 is provided between adjacent seats 6b, 6c, the widths of which may have been extended to form the bench seat 900, the movable table 300 may be positioned substantially completely underneath the seat bodies 210 of the adjacent seats 6b, 6c. In other words, the movable table 300 may be stowed underneath the seat bodies 210 of the adjacent seats. The size of the table top 310 may be configured such that the table top 310 can be positioned between seat pillars 220 of adjacent seats when their seat bodies are aligned in a longitudinal or lateral direction of the vehicle, or abut to form the bench seat 900.

Figure 10:
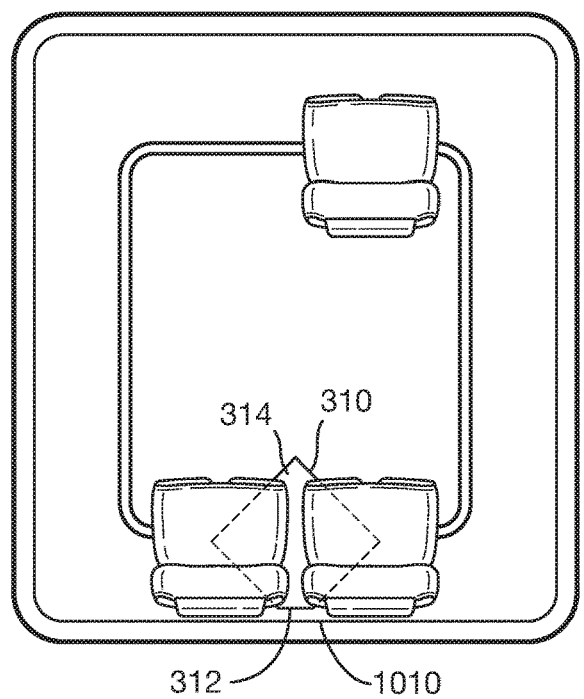
FIG. 10 is a schematic plan view of a motor vehicle comprising a table with a collapsible portion.

With reference to FIG. 10, in some arrangements, due to the size of the table top 310 and/or the arrangement of the guide track assembly 8 relative to an internal wall 1010 of the vehicle, it may be desirable for a portion 312 of the table top 310 to be collapsible, such that the collapsible portion can be collapsed in order to prevent the portion 312 of the table top 310 from colliding with the interior wall 1010 as the movable table 300 moves around the guide track assembly 8. As depicted in FIG. 10, the collapsible portion forms a corner of the table top 310 located adjacent to the interior wall 1010 as the movable table 300 moves along the guide track assembly 8.

When the movable table 300 is located at a position in which sufficient space is available, the collapsible portion 312 may be deployed into a substantially flat, horizontal configuration flush with and parallel to a non-collapsible portion 314 of the table top 310, in order to maximize table space.

With reference to FIGS. 11a, 11b and 11c, the collapsible portion 312 of the table top may comprise a plurality of elongate members 312a extending across the table top. As depicted in FIGS. 11b and 11c, the elongate members 312a may be wedge shaped in cross-section, such that the width of the elongate members 312a reduces between an upper surface 310a of the table top and a lower surface 310b of the table top.

The collapsible portion 312 may comprise a cover 312b extending over the elongate members 312a. The cover 312b forms an outer surface of the collapsible portion 312 of the table top. The cover 312b may be flexible in order to conform to the shape of the collapsible portion when the collapsible portion is deployed and collapsed. When the collapsible portion 312 is in a deployed, e.g., horizontal, configuration, as depicted in FIG. 11b, the cover 312b may form part of the upper and lower surfaces 310a, 310b of the table top 310 in the area of the collapsible portion 312.

The movable table 300 further comprises a first cable 314 extending between the elongate members 312a of the collapsible portion 312. The first cable 314 is configured such that, when the cable is in tension, the cable 314 pulls on the elongate elements to deploy the collapsible portion 312 of the table. As depicted in FIGS. 11b and 11c, each of the elongate members 312a may define a shoulder 312c, when the cable is in tension. Each of the elongate elements 312 may abut the adjacent elongate elements at their respective shoulders 312c in order to hold the collapsible portion 312 in the deployed configuration.

When the tension in the first cable 314 is released, the elongate elements 312a may move, e.g., pivot and/or slide against each other as the collapsible portion 312 collapses into the collapsed configuration depicted in FIG. 11c. The collapsible portion 312 may comprise a biasing element configured to bias the collapsible portion 312 into the collapsed configuration when the tension in the cable 314 is released. Alternatively, the collapsible portion 312 may collapse due to the weight of the elongate elements 312a.

In some arrangements, the movable table 300 may additionally comprise a further or second cable extending between the elongate elements 312a. The second cable may be configured such that when the second cable is in tension, the second cable pulls on the elongate elements 312a to collapse the collapsible portion. Either the first cable or the second cable may be placed in tension in order to arrange the collapsible portion 312 of the table top in the desired configuration.

In other arrangements of the disclosure, the collapsible portion 312 may comprise a biasing element configured to bias the collapsible portion 312 into the deployed configuration. In this arrangement, when the first cable 314 is not under tension, the collapsible portion 312 may remain in the deployed configuration. The first cable 314 may be configured such that when the cable is under tension, the cable 312 acts to hold the collapsible portion 312 in the deployed configuration in order to increase the support that can be provided by the collapsible portion to objects placed on the table top 310. The second cable may be configured to pull on the elongate elements 312a to collapse the collapsible portion 312 when desired. Alternatively, when the collapsible portion is biased into the deployed configuration, the first cable 314 may be configured to pull on the elongate elements 312a to collapse the collapsible portion when the first cable 314 is under tension. In this case, the second cable may be omitted.

In other arrangements, the collapsible portion 312 may comprise a flap pivotally coupled to the table top 310 or a plurality of flaps pivotally coupled to one or more adjacent flaps over the length of the collapsible portion.

In the arrangement depicted, the collapsible portion 312 of the table top is provided at a corner of the table that is adjacent to the interior wall of the vehicle as the table moves around the guide track assembly 8. In other arrangements, the collapsible portion 312 may additionally or alternatively be provided at one or more other areas of the table top, such as other corners of the table top. For example, the collapsible portion 312 of the table top may be provided at an opposite corner of the table top closest to the interior space of the vehicle, and may be collapsible in order to prevent the table top 310 from protruding out from under the seats when the table is stowed underneath the seats.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A movable table for a motor vehicle having a guide track extending at least partially around an interior space of the vehicle, comprising:
    a table top;
    a pillar comprising a first end coupled to the table top; and
    a follower element provided at a second end of the pillar and configured to movably couple the table to the guide track such that the table is movable between seats positioned at seating positions, wherein the table top comprises a collapsible portion that comprises a plurality of elongate members configured to move relative to one another in order to permit the table top to collapse, wherein the table top comprises one or more cables extending between the elongate members, and wherein the one or more cables are configured to hold the elongate members together when the collapsible portion is not collapsed.

2. The movable table of claim 1, wherein the guide track comprises a rail or slot, wherein the follower element is configured to movably couple the table to the rail or slot of the guide track.

3. The movable table of claim 1, wherein the follower element comprises a roller configured to engage the guide track.

4. The movable table of claim 1, wherein the guide track is a first guide track and the motor vehicle comprises a second guide track provided adjacent to the first guide track and extending parallel to the first guide track between the two or more seating positions, and wherein the follower element is a first follower element and the table comprises a second follower element configured to movably couple to the second guide track.

5. The movable table of claim 4, wherein the table comprises a boss coupled to the second end of the pillar, wherein the first and second follower elements are provided on the boss.

6. The movable table of claim 1, wherein the table further comprises a securing mechanism configured to selectively secure the table relative to a frame of the vehicle.

7. The movable table of claim 1, wherein the pillar comprises a storage space defined within the pillar.

8. The movable table of claim 1, wherein the movable table comprises an actuator configured to drive the movement of the movable table along the guide track.

9. The movable table of claim 1, wherein a height of the table top of the movable table above the guide track is adjustable.

10. The movable table of claim 1, wherein the table rotates as it moves along the guide track by virtue of the guide track changing direction.

11. The movable table of claim 1, wherein the table is configured to rotate relative to the guide track.

12. A motor vehicle assembly comprising:
a guide track extending at least partially around a space within an interior of the vehicle between a plurality of seating positions;
a table movably coupled to and supported by the guide track, such that the table is movable along the guide track between the seats positioned at the seating positions; and
two or more seats, wherein the table is coupled to a first guide track between two of the seats and is movable between the two seats, and wherein the seats are movably coupled to the guide track and are movable along the guide track between the seating positions, wherein a height of a table top of the table above the first guide track is less than heights of seat bodies of the seats above the first guide track, such that the table top can be positioned at least partially beneath the seat body of one or more of the seats.

13. The motor vehicle assembly of claim 12, wherein at least a first portion of the guide track extends in a longitudinal direction of the motor vehicle, at least a second portion of the guide track extends in a lateral direction of the motor vehicle, and at least a third portion of the guide track is curved.

14. The motor vehicle assembly of claim 12, wherein the guide track is a first guide track and the assembly further comprises a second guide track provided adjacent to the first guide track and extending parallel to the first guide track between the seating positions, wherein the table is movably coupled to the second guide track.

15. The motor vehicle assembly of claim 12, wherein the table is rotatable such that when the table is stowed beneath the seat body, a diagonal axis of the table is aligned with a longitudinal axis of the seat.

16. The motor vehicle assembly of claim 12, wherein the table is movable between a stowed position, in which the table is positioned at least partially beneath seat bodies of one or more of the seats, and a deployed position, in which the table is away from beneath the seat bodies.

17. The motor vehicle assembly of claim 12, wherein the table is configured such that when the two seats are substantially aligned, the table is stowable beneath seat bodies of the two seats.

18. The motor vehicle assembly of claim 12, wherein the movable table is positionable in a corner of the motor vehicle between the two seats, the seats being arranged perpendicular to one another, and wherein a first edge of the table top is positionable alongside an edge of a first seat and a second edge of the table top is positionable alongside an edge of a second seat, and wherein first and second edges of the table top are substantially perpendicular to each other.

* * * * *